United States Patent [19]
Lucht et al.

[11] Patent Number: 4,583,845
[45] Date of Patent: Apr. 22, 1986

[54] PHOTOGRAPHIC PRINTER

[75] Inventors: Orren J. Lucht, Farmington; Stephen A. Bartz, Jordan, both of Minn.

[73] Assignee: Lucht Engineering, Inc., Minneapolis, Minn.

[21] Appl. No.: 614,945

[22] Filed: May 29, 1984

Related U.S. Application Data

[63] Continuation of Ser. No. 419,143, Sep. 17, 1982, abandoned, which is a continuation of Ser. No. 218,578, Dec. 22, 1980, abandoned.

[51] Int. Cl.⁴ .................... G03B 27/52; G03B 27/44
[52] U.S. Cl. ........................................ 355/46; 355/55
[58] Field of Search .................... 355/46, 40, 64, 55

[56] References Cited
U.S. PATENT DOCUMENTS

| | | | |
|---|---|---|---|
| 3,826,571 | 7/1974 | Spence-Bate | 355/46 |
| 3,951,545 | 4/1976 | Lucht | 355/46 |
| 4,027,968 | 6/1977 | Spence-Bate | 355/46 |

Primary Examiner—Monroe H. Hayes
Attorney, Agent, or Firm—Kinney & Lange

[57] ABSTRACT

An improved photographic printer having a plurality of lens assemblies with each lens assembly including a plurality of optical elements spaced from each other along the general direction of the printer optical path. The optical elements of each lens assembly are movable relative to each other between first and second positions with one of the first and second positions being within the optical path and the other being without the optical path. A plurality of positioning elements are adapted to cooperate with different ones of the optical elements to selectively position them in the first or second position. Specifically, the plurality of lens assemblies are movably supported to alternatively position each with its optical elements in conjunction with the positioning elements for movement of the optical elements between the first and second positions. In a preferred embodiment, the lens assemblies are supported by a carrousel and the optical elements may include lenses and baffles. Preferably, the positioning elements are plungers with the carrousel rotatably supporting the lens assemblies about the plungers. The optical elements may be supported on tracks carried by the lens assemblies with the plungers being operatively aligned with the tracks of that lens assembly which has its optical elements in conjunction with the plungers. The location of the optical elements within the optical path is alterable without affecting the alignment between the tracks and the plungers.

16 Claims, 3 Drawing Figures

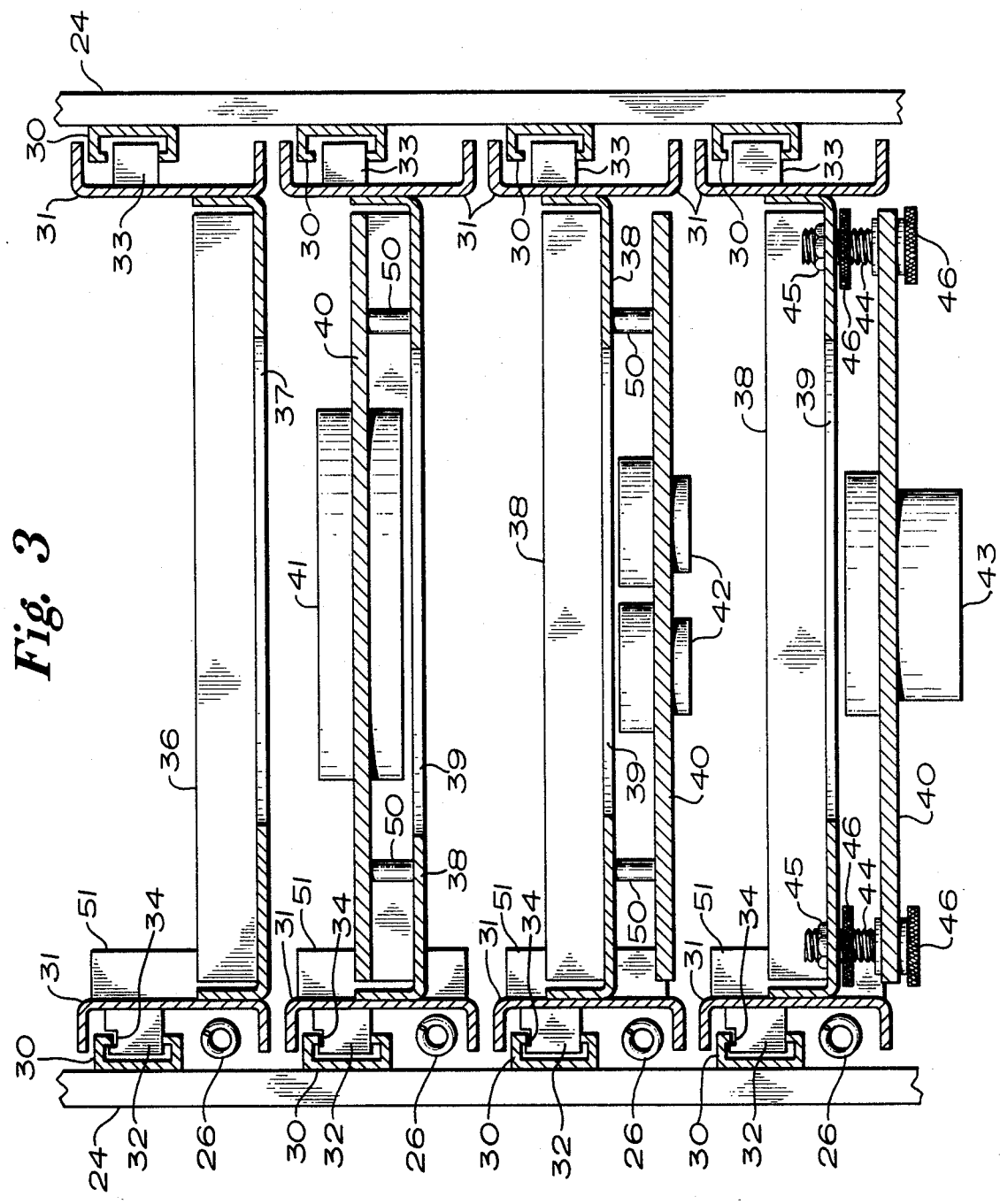

PHOTOGRAPHIC PRINTER

This is a continuation of application Ser. No. 419,143, filed Sept. 17, 1982, now abandoned, which is a continuation of application Ser. No. 218,578, filed on Dec. 22, 1980, now abandoned.

DESCRIPTION

1. Background of Prior Art

Photographic printers are known to the prior art. Automatic printers typically include supply and take up rollers for photosensitive photographic material and a mechanism to automatically advance the material through an exposure area or station. The image to be exposed is established in known manner and projected on the photographic material in the exposure area. A shutter is employed to control the exposure. An example of this type of printer is disclosed in U.S. Pat. No. 3,951,545 issued Apr. 20, 1976, in the name of Orren J. Lucht for Photographic Print Apparatus which is commonly owned with the present invention and which is hereby incorporated by reference.

The printer of the incorporated patent employs an interchangeable lens assembly formed of stacked, alternative lens configurations. That is, the different lens configurations are spaced from each other along the general direction of the printer optical path. They are movable, within the lens assembly, between first and second positions—one of those positions being within the optical path of the printer with the other being without the optical path. Selectively actuated plungers are operative to position the desired lens configuration within the printer's optical path.

The printer of the incorporated patent provides greater flexibility than other prior art printers and has contributed significantly to the photographic printing industry. However, it is inherently limited in the number of alternative lens configurations it can provide which may require a manual substitution of one lens assembly for another when the desired lens configuration is not available in the lens assembly contained in the printer.

2. Brief Summary of Invention

The present invention provides an improvement to the photographic printer of the incorporated patent. Specifically, the present invention provides a significant increase in the number of lens configurations that are available without requiring a manual substitution of one lens assembly for another. The improvement of the present invention may be substituted for the lens assembly of the incorporated patent with the other mechanisms illustrated in that patent being retained for cooperation with the present invention. Also, the various controls for the present invention may be of the type used with the device of the incorporated patent. Specifically, a preferred embodiment of the present invention is implemented by a substitution of the present invention for the lens assembly and lens selecting plungers disclosed in the incorporated patent.

The advantages of the present invention are accomplished by providing a plurality of lens assemblies each having a plurality of differing optical element configurations, the differing configurations being spaced from each other along the general direction of the printer optical path and being movable relative to each other between first and second positions. One of the first and second positions is within the optical path and the other is without the printer optical path. A single set of positioning members, which may be similar to those disclosed in the incorporated patent, is provided while the plurality of lens assemblies are supported for movement about the positioning members to alternatively position each with its optical elements in conjunction with the positioning members for movement of the optical elements between the first and second positions. In a preferred embodiment, the support for the plurality of lens assemblies may be a carrousel while the optical elements include lenses and baffles. Tracks may be provided within each lens assembly to support the optical elements with the tracks of each lens assembly being operatively aligned with the positioning members when a lens assembly has its optical elements in conjunction with the positioning members. The optical elements are slidable along the track between the first and second positions and may be adjusted along the optical path.

BRIEF DESCRIPTION OF DRAWINGS

FIG. 3 is a cross-section taken along the line 3—3 in FIG. 1 showing specific construction details.

DETAILED DESCRIPTION OF INVENTION

The present invention provides an improvement to the incorporated patent and may be employed as a substitute for the lens assemblies and plungers of that patent with the remaining elements of the patented combination functioning as described herein.

Figure 1:
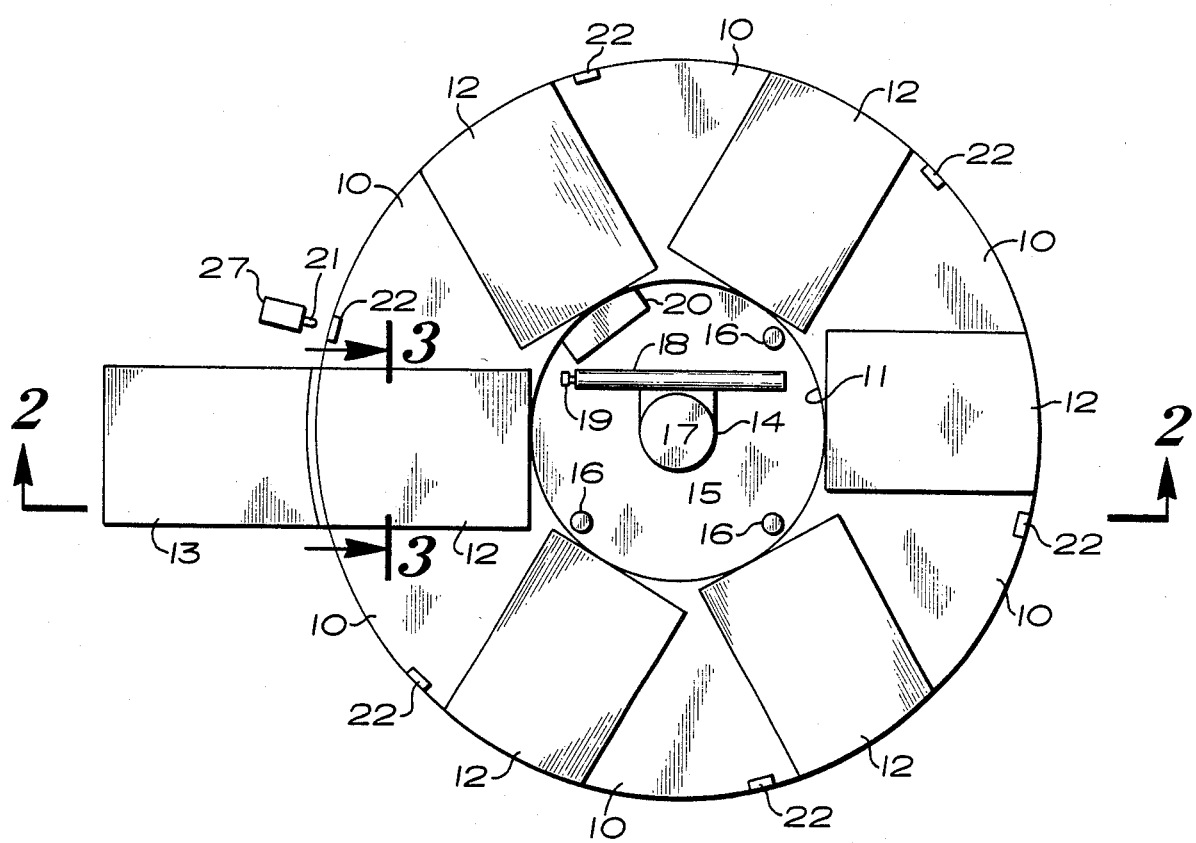
FIG. 1 is a top cutaway view that diagrammatically illustrates a preferred embodiment of the present invention.

FIG. 1 is a top diagrammatic view with the top supporting plate removed for clarity. The top supporting plate is discussed with reference to FIG. 2, below. In FIG. 1, a lower circular plate 10 having a central aperture 11 carries a plurality of lens assemblies 12. The lens assemblies 12 are of the general type disclosed in the incorporated patent wherein a plurality of optical elements are spaced from each other within each lens assembly along the general direction of the printer optical axis. That optical path direction is perpendicular to the plane of the view illustrated in FIG. 1. As will be described more fully below, the optical elements of the lens assemblies 12 are maintained in a first position and are adapted to be movable to a second position so as to move between positions within and without the optical path. In the lens assembly of the incorporated patent, those positions are both within the lens assembly. However, in the illustrated preferred embodiment, the position within the optical path is within a projection station indicated at 13 in FIG. 1. Thus, the optical elements that form the several lens assemblies are maintained in a first position outside the printer optical path and are movable to a second position (in all cases within the projection station 13). Alternatively, each of the lens assemblies 12 may be integrally formed with a portion defining a projection station. However, this would greatly increase the size of the device and significantly increase the weight that must be supported.

A central post 14 extends upwardly through the aperture 11 in plate 10 and carries a stationary platform 15, the platform 15 underlying the aperture 11 in plate 10. Bearings 16 are carried on the platform 15 and engage the edge of the aperture 11 and plate 10 to maintain the plate 10 concentric relative to the post 14. A bearing 17 is carried at the upper portion of the post 14 for cooperation with a top plate to be described with reference to FIG. 2.

A plurality of plunger mechanisms 18 having plunger elements 19 are supported by the post 14 in spaced relation to each other along the post 14. Plunger 18 may be fluid actuated cylinders or may be electrically activated, in known manner. In any case, a plunger element 19 on activation of the plunger mechanism 18, will extend from the plunger mechanism 18 with that extension resulting in the movement of an optical element carried by a lens assembly 12 into the projection station 13. A motor 20 is carried by the platform 15 and cooperates with the aperture 11 in the plate 10 to result in a rotation of the plate 10 and the lens assemblies 12. By this rotation or carrousel movement, each of the lens assemblies 12 may be alternatively positioned with their optical elements in conjunction with the plungers 18 such that activation of the plungers 18 result in a movement of those optical elements from the respective lens assemblies 12 to the projection station 13. Proper registration between a selected lens assembly 12 and the plunger mechanisms 18 may be established and maintained by another plunger type device 27, the plunger mechanism 27 having a rod 21 which will extend from the mechanism 27 on activation of that mechanism to engage a hole in blocks 22 carried on the lower plate 10. The blocks 22 are positioned such that one of the lens assemblies 12 is properly aligned relative to the plunger mechanisms 18 when the rod 21 is in its hole. The fact of proper cooperation between the plunger mechanism 27 and the several blocks 22 may be established in any known and desired manner.

Figure 2:
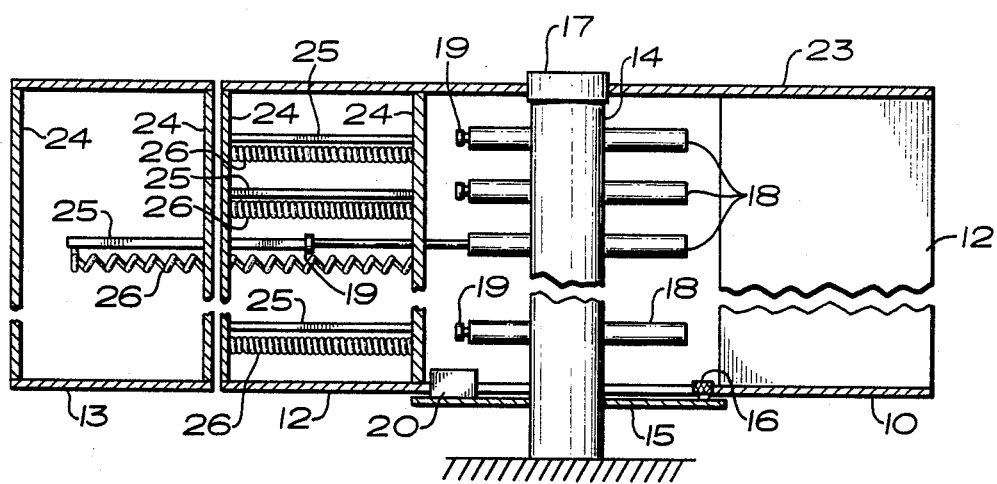
FIG. 2 is a diagrammatic cross-sectional view taken along the line 2—2 in FIG. 1.

FIG. 2 is a diagrammatic illustration of a cross-section taken along the line 2—2 in FIG. 1, including a view of top plate 23, with that lens assembly designated generally by an arrow 12 being the only one shown in any detail. As shown in FIG. 2, the post 14 is firmly anchored and carries a stationary platform 15 underneath the aperture 11 in the lower plate 10. The post 14 extends through the aperture 11 and terminates at a bearing 17. Bearing 17 cooperates with the top plate 23 to support several lens assemblies 12. Lens assemblies 12 may be formed as by beams 24 extending between the top and lower plates 23 and 10, respectively. In FIG. 2, elements 25 represent optical elements forming a part of the present invention with their support within the lens assemblies 12 and projection station 13 being described below with reference to FIG. 3. Springs 26 bias the optical elements 25 to maintain them within the lens assembly 12 while extension of the plunger element 19 of a plunger mechanism 18 will result in an extension of the associated optical element 25 into the projection station 13. In FIG. 2, one plunger mechanism 18 has its plunger element 19 partly extended with the associated optical element 25 extending into the projection station 13. Projection station 13 is essentially a frame and may be formed in a manner similar to the lens assembly 12, including beams 24.

Referring now to FIG. 3, there is illustrated a cross-section taken along the line 3—3 of FIG. 1 which shows the detail of the means by which the optical elements forming the lens assemblies 12 are supported in both the lens assemblies 12 and the projection station 13. Beams 24 may be positioned at or adjacent the corners of the area forming the lens assemblies 12 and projection station 13 and have a plurality of tracks formed by rails or slideways 30, channels 31 and slides 32 and 33. The rails 30 are secured to the beams 24 in any desired manner while the slides 32 and 33 are secured to the channels 31 to extend from the channels 31 into the rails 30. Slides 33 may be generally circular so as to slide or roll within its associated rail while slides 32 are provided with a notch as indicated at 34 to engage the rail 30 and maintain the association between the slide 32 and rail 30. As many slides 32 and 33 as are necessary may be employed within the scope of the present invention. It is presently contemplated that for each optical element two of slides 32 will be employed to be located adjacent opposite ends of the lens assembly, when the optical element is within the lens assembly, with a single slide 33 located generally at the center of the lens assembly. A spring 26 may be secured in any desired manner to one of the beams 24 and to the channel 31 so as to bias the channels, and their associated optical elements, in the position wherein they are contained within the lens assemblies 12.

A single set of plunger mechanisms 18 (see FIGS. 1 and 2) is employed with all of the lens assemblies 12 with those lens assemblies being supported for rotation as on a carrousel so as to alternatively position their optical elements in conjunction with the plunger mechanisms 18. Accordingly, each of the tracks formed of elements 30-34 is positioned within the lens assemblies so as to be in general alignment with one of the plunger elements 19 of a plunger mechanism 18 when that lens assembly has its optical elements in conjunction with the plunger mechanism 18. For the purpose of this specification and claims, the term "conjunction" means that a lens assembly has its optical elements positioned so as to be movable on activation of one or more of the plunger mechanisms 18. In that condition, the rails 30 of the lens assembly 12 having its optical elements in conjunction with the plunger mechanisms 18 will have its rails 30 in alignment with rails carried by the beams 24 of projection station 13 such that the slides 32 and 33 will pass from the rails of the lens assembly to the rails of the projection station. Feet 51 are formed on and carried by the channels 31 for engagement by the plunger elements 19.

The optical elements within the lens assemblies 12 may take the form of lenses and/or baffles. For example, the upper tracks of FIG. 3 have associated with them a plate 36 having a central opening 37. The central opening 37 may be employed to control stray light within the projection station 13 and, accordingly, may function as a baffle. A similar plate 38 extends between the remaining tracks illustrated in FIG. 3 also having a central opening 39. However, the plates 38 have associated with them lens boards 40 each carrying a different lens configuration 41-43. As illustrated in the lowermost track/plate combination, a threaded post 44 extends between the lens board 40 and through an aperture in the plate 38 to be engaged on each side of the plate 38 by nuts 45 and 46. Nut 46 is knurled to provide ease of manual manipulation and, on tightening of the nut 46, the post 44 is secured to the plate 38. A bolt 46 extending through lens board 40 engages a threaded bore in the post 44 to secure lens board 40 to the post 44 and, accordingly, to the plate 38. As is apparent to those skilled in the art, this type of interconnection between plates 38 and lens board 40 allows a relative movement between them and, accordingly, an adjustment of the lens board 40, and its associated lens configuration, along the optical path of the printer. Other means of attachment of the lens board to the plate may be employed while retaining the adjustability feature. It is contemplated that four points of attachment will be employed within a preferred embodiment of the present invention. The attachment between the plate 38 and lens board 40 associated with the middle two tracks illustrated in FIG. 3 are designated generally at 50 and may be of any desired design.

In addition to the adjustability of the lens boards 40 relative to the plates 38, the plates 38 may be secured to the channels 31 at any desired location along their vertical span. This provides further adjustability of the optical elements within the optical path. Plates 36 and 38 may be secured to the channel as by a nut and bolt arrangement with the channels 31 being provided with elongated slots or a series of holes to facilitate the movement of the plates relative to the channels, in known manner. Further, the plates 36 and 38 may have the orientation illustrated in FIG. 3 or they may be inverted for still further adjustability. Springs 26 may be secured to the beams 24 and channel members 31 in any desired manner.

Obviously, many modifications and variations of the present invention are possible in light of the above teachings. For example, plunger mechanisms 18 may be activated electrically or by fluid power. In a preferred embodiment, the plunger mechanisms are pneumatic cylinders which are powdered in each direction as by alternatively applying pressure on either side of a piston contained within the main body of the plunger mechanism 18. Of course, any type of positioning mechanism may be employed without departing from the scope of the present invention and such mechanisms are intended to be embraced by the term "plunger." Further, various indicators may be employed to indicate that a desired optical element is in place and to prevent rotation of the carrousel when an optical element is in the projection station 13. Further, in FIG. 3, the tracks are illustrated as being evenly spaced. Although this is a preferred configuration, the tracks may be other than evenly spaced to accommodate differing lens configurations, it being necessary only that the tracks be positioned consistently with the positioning of the plunger mechanisms 18 so as to provide a general alignment between them when the desired optical elements of a lens assembly are in conjunction with the plunger mechanisms 18. It is therefore to be understood that, within the scope of the appended claims, the invention may be practiced otherwise than as specifically described.

We claim:

1. In a photographic printer of the type having lens assembly means including a plurality of optical element means spaced from each other along the general direction of the printer optical path, the optical element means being movable relative to each other between first and second positions with one of said first and second positions being within the optical path and the other being without the optical path, and having a plurality of positioning means adapted to cooperate with different ones of said optical element means for selectively positioning said optical element means in said first or second position, the improvement wherein said lens assembly means define one of said first and second positions and further comprising:

stationary optical element means receiving station means defining the other of said first and second positions in common for the optical element means of multiple lens assembly means, each of said lens assembly means and said receiving station means comprising track means; and means movably supporting a plurality of said lens assembly means and alternatively positioning each with its optical element means in conjunction with said positioning means and the track means of said lens assembly means in alignment with track means of said receiving station means for movement of said optical element means along said track means from said lens assembly means to said receiving station means, and return, on movement between said first and second positions.

2. The photographic printer of claim 1 wherein said supporting and alternatively positioning means comprises carrousel means.

3. The photographic printer of claim 2 wherein said optical element means comprises lens means and baffle means.

4. The photographic printer of claim 1 wherein said optical element means comprises lens means and baffle means.

5. The photographic printer of claim 1 wherein said positioning means comprises plunger means.

6. The photographic printer of claim 5 wherein said supporting and alternatively positioning means comprises carrousel means rotatably supporting said lens assembly means about said plunger means.

7. The photographic printer of claim 6 wherein said optical element means comprises lens means and baffle means.

8. The photographic printer of claim 1 wherein said optical element means are adjustably supported by said track means.

9. The photographic printer of claim 1 wherein said optical element means comprises plate means slidable along said track means between said first and second positions.

10. The photographic printer of claim 9 further comprising lens boards supported by at least some of said plate means, said lens boards being adjustable along said optical axis relative to said plate means.

11. The photographic printer of claim 10 wherein less than all of said plate means support a lens board.

12. The photographic printer of claim 10 wherein said plate means are alternatively positionable along said optical axis relative to said track means.

13. The photographic printer of claim 12 wherein at least some of said plate means comprise baffle means.

14. The photographic printer of claim 13 wherein said positioning means comprises plunger means.

15. The photographic printer of claim 14 wherein said supporting and alternatively positioning means comprises carrousel means rotatably supporting said lens assembly means about said plunger means.

16. The photographic printer of claim 15 wherein said plunger means comprises fluid actuated means.

* * * * *